(12) United States Patent
Choi et al.

(10) Patent No.: US 12,079,305 B2
(45) Date of Patent: Sep. 3, 2024

(54) APPARATUS FOR ENCODING AND DECODING FEATURE MAP AND METHOD USING THE SAME

(71) Applicants: ELECTRONICS AND TELECOMMUNICATIONS RESEARCH INSTITUTE, Daejeon (KR); Hanbat National University Industry-Academic Cooperation Foundation, Daejeon (KR)

(72) Inventors: Hae-Chul Choi, Daejeon (KR); Sang-Woon Kwak, Daejeon (KR); Joung-Il Yun, Daejeon (KR); Hee-Ji Han, Daejeon (KR)

(73) Assignees: ELECTRONICS AND TELECOMMUNICATIONS RESEARCH INSTITUTE, Daejeon (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 455 days.

(21) Appl. No.: 17/459,797

(22) Filed: Aug. 27, 2021

(65) Prior Publication Data
US 2022/0108127 A1  Apr. 7, 2022

(30) Foreign Application Priority Data

Oct. 6, 2020 (KR) .......................... 10-2020-0128656
May 11, 2021 (KR) .......................... 10-2021-0060595

(51) Int. Cl.
*G06K 9/00* (2022.01)
*G06F 18/213* (2023.01)
(Continued)

(52) U.S. Cl.
CPC ............ *G06F 18/213* (2023.01); *G06F 18/22* (2023.01); *G06F 18/23* (2023.01); *G06N 3/04* (2013.01); *G06V 10/758* (2022.01)

(58) Field of Classification Search
CPC .............................. H04N 19/70; G06N 3/045
See application file for complete search history.

(56) References Cited

U.S. PATENT DOCUMENTS 10,733,767 B2 * 8/2020 Cho .......................... G06T 9/00
10,740,865 B2 * 8/2020 Lee ........................ G06N 3/045
(Continued)

FOREIGN PATENT DOCUMENTS

CN          109902763 A  *  6/2019
KR   10-2016-0143548 A     12/2016
(Continued)

OTHER PUBLICATIONS

Ling-Yu Duan et al., "Video Coding for Machines: A Paradigm of Collaborative Compression and Intelligent Analytics," arXiv:2001.03569v2 [cs.CV] Jan. 13, 2020.

*Primary Examiner* — Andrew M Moyer
*Assistant Examiner* — Aidan Keup

(57) ABSTRACT

Disclosed herein are an apparatus for encoding and decoding a feature map and a method using the apparatus. The feature map encoding apparatus include a processor for acquiring feature map information corresponding to a feature map, reconstructing the feature map based on the feature map information, and generating an encoded feature map by converting each feature value corresponding to the reconstructed feature map from a real number into an integer, and a memory for storing the feature map information.

16 Claims, 14 Drawing Sheets

(51) Int. Cl.
*G06F 18/22* (2023.01)
*G06F 18/23* (2023.01)
*G06N 3/04* (2023.01)
*G06V 10/75* (2022.01)

(56) References Cited

U.S. PATENT DOCUMENTS

| | | |
|---|---|---|
| 10,784,892 B1 | 9/2020 | Lan |
| 11,030,480 B2 | 6/2021 | Cho et al. |
| 11,288,770 B2 | 3/2022 | Kim |
| 11,423,311 B2 | 8/2022 | Brothers |
| 2019/0079801 A1 | 3/2019 | Lyuh et al. |
| 2019/0164037 A1 | 5/2019 | Kim et al. |
| 2022/0004810 A1* | 1/2022 | Sinha ............... G06V 10/454 |

FOREIGN PATENT DOCUMENTS

| | | | |
|---|---|---|---|
| KR | 10-2018-0131073 A | 12/2018 | |
| KR | 10-2018-0136720 A | 12/2018 | |
| KR | 10-2020-0026026 A | 3/2020 | |
| KR | 10-2020-0044668 A | 4/2020 | |
| WO | WO-2020080827 A1 * | 4/2020 | ........... G06K 9/4628 |

\* cited by examiner

APPARATUS FOR ENCODING AND DECODING FEATURE MAP AND METHOD USING THE SAME

CROSS REFERENCE TO RELATED APPLICATIONS

This application claims the benefit of Korean Patent Application Nos. 10-2020-0128656, filed Oct. 6, 2020, and 10-2021-0060595, filed May 11, 2021, which are hereby incorporated by reference in their entireties into this application.

BACKGROUND OF THE INVENTION

1. Technical Field

The present invention relates generally to technology for encoding and decoding a feature map, and more particularly to technology that is capable of efficiently encoding/decoding a feature map through realignment, reconstruction, and real number/integer conversion processes.

2. Description of the Related Art

Artificial Intelligence (AI) technology is composed of machine-learning (deep learning) technology using an algorithm that self-classifies/learns the features of pieces of input data and element technologies that simulate functions of the human brain, such as recognition and judgment, by utilizing a machine-learning algorithm.

Of such AI technology, a Convolutional Layer Network (CNN) model used for image analysis is employed to extract desired features from an image or a picture. In this procedure, feature map encoding technology may be utilized to reduce the storage size of feature map images generated for respective channels. For example, a feature map may be compressed using a typical video compression scheme, but when a conventional image compression scheme is applied to the feature map, a problem may arise in that it is difficult to effectively utilize the conventional image compression scheme within a CNN model.

Therefore, there is urgently required technology that is capable of effectively encoding and decoding a feature map generated during CNN processing.

PRIOR ART DOCUMENTS

Patent Documents (Patent Document 1) Korean Patent Application Publication No. 10-2020-0026026, Date of Publication: Mar. 10, 2020 (Title: Electronic Device for High-Speed Compression Processing of Feature Map of CNN Utilizing System and Controlling Method thereof CNN)

SUMMARY OF THE INVENTION

Accordingly, the present invention has been made keeping in mind the above problems occurring in the prior art, and an object of the present invention is to provide technology for effectively encoding and decoding a feature map in a feature extraction process using a neural network model.

Another object of the present invention is to provide technology that is capable of effectively utilizing an encoded and decoded feature map in a neural network while effectively encoding and decoding a feature map.

In accordance with an aspect of the present invention to accomplish the above objects, there is provided a feature map encoding apparatus, including a processor for acquiring feature map information corresponding to a feature map, reconstructing the feature map based on the feature map information, and generating an encoded feature map by converting each feature value corresponding to the reconstructed feature map from a real number into an integer; and memory for storing the feature map information.

The feature map information may include at least one of a neural network layer number, a feature map horizontal length, a feature map vertical length, a feature map channel length, a feature map channel number, and a feature map channel difference.

The processor may be configured to, when the feature map is constructed using multiple channels, classify the multiple channels into one or more feature map channel groups based on feature values.

The processor may determine similarities between a feature value of a reference channel and respective feature values of the multiple channels and classify the multiple channels in descending order of similarities.

The processor may realign the classified multiple channels in an order of the channel groups of the feature map or in descending order of similarities.

The processor may reconstruct the realigned multiple channels into one feature map channel.

The one feature map channel may correspond to a matrix form having a preset size.

The processor may sequentially input the realigned multiple channels to matrix values of the one feature map channel.

The processor may convert each feature value from a real number into an integer through a normalization procedure that uses at least one of an average of the feature value, a variance of the feature value, a minimum value of a range after conversion, and a maximum value of the range after conversion.

The processor may classify the multiple channels into one or more feature map channel groups using a clustering algorithm.

In accordance with another aspect of the present invention to accomplish the above objects, there is provided a feature map decoding apparatus, including a processor for acquiring feature map information corresponding to an encoded feature map, inversely reconstructing the encoded feature map based on the feature map information, and generating a decoded feature map by converting each feature value corresponding to the inversely reconstructed feature map from an integer into a real number; and a memory for storing the feature map information.

The feature map information may include at least one of a neural network layer number, a feature map horizontal length, a feature map vertical length, a feature map channel length, a feature map channel number, and a feature map channel difference.

The processor may divide one feature map channel corresponding to a matrix form having a preset size into multiple channels based on the feature map horizontal length and the feature map vertical length.

The processor may inversely realign the multiple channels in an order corresponding to the feature map channel number.

The processor may convert each feature value from an integer into a real number through a normalization procedure that uses at least one of an average of the feature value, a variance of the feature value, a minimum value of a range after conversion, and a maximum value of the range after conversion.

In accordance with a further aspect of the present invention to accomplish the above objects, there is provided a method for encoding and decoding a feature map, including acquiring feature map information corresponding to a feature map, and reconstructing the feature map based on the feature map information; generating an encoded feature map by converting each feature value corresponding to the reconstructed feature map from a real number into an integer; acquiring the feature map information, and inversely reconstructing the encoded feature map based on feature map information corresponding to the encoded feature map; and generating a decoded feature map by converting each feature value corresponding to the inversely reconstructed feature map from an integer into a real number.

The feature map information may include at least one of a neural network layer number, a feature map horizontal length, a feature map vertical length, a feature map channel length, a feature map channel number, and a feature map channel difference.

Reconstructing the feature map may include, when the feature map is constructed using multiple channels, classifying the multiple channels into one or more feature map channel groups based on feature values; realigning the classified multiple channels in an order of the feature map channel groups; and reconstructing the realigned multiple channels into one feature map channel.

Reconstructing the feature map may include, when the feature map is constructed using multiple channels, determining similarities between a feature value of a reference channel and respective feature values of the multiple channels, and classifying the multiple channels in descending order of similarities; realigning the classified multiple channels in descending order of similarities; and reconstructing the realigned multiple channels into one feature map channel.

The one feature map channel may correspond to a matrix form having a preset size.

Reconstructing the feature map may be configured to sequentially input the realigned multiple channels to matrix values of the one feature map channel.

Generating the encoded feature map may include converting each feature value from a real number into an integer through a normalization procedure that uses at least one of an average of the feature value, a variance of the feature value, a minimum value of a range after conversion, and a maximum value of the range after conversion.

Classifying the multiple channels into the one or more feature map channel groups may classify the multiple channels into one or more feature map channel groups using a clustering algorithm.

Inversely reconstructing the encoded feature map may include dividing one feature map channel corresponding to a matrix form having a preset size into multiple channels based on the feature map horizontal length and the feature map vertical length.

Inversely reconstructing the encoded feature map may include inversely realigning the multiple channels in an order corresponding to the feature map channel number.

Generating the decoded feature map may include converting each feature value from an integer into a real number through a normalization procedure that uses at least one of an average of the feature value, a variance of the feature value, a minimum value of a range after conversion, and a maximum value of the range after conversion.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
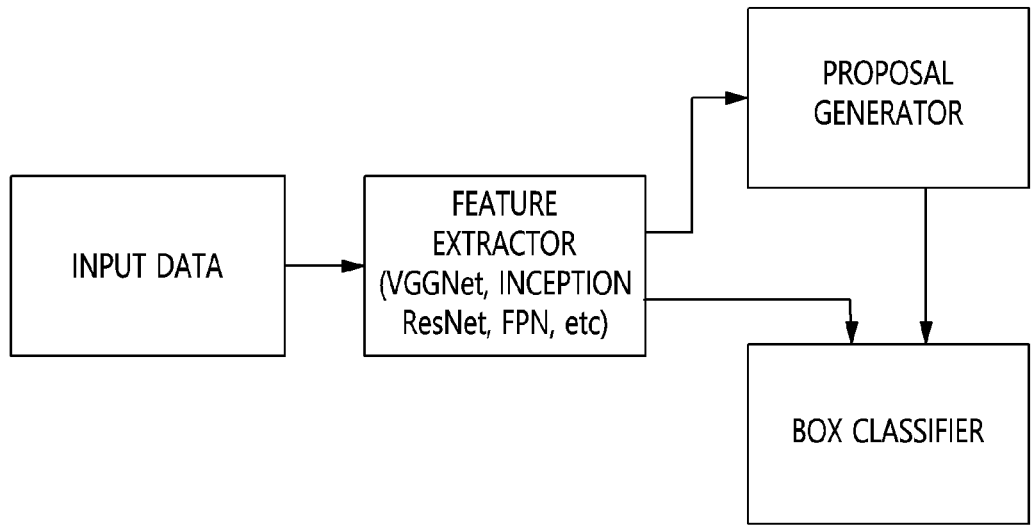
FIG. 1 is a diagram illustrating an example a representative meta-structure of a neural network (Faster R-CNN)

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

In a neural network, result (feature) values that are output when at least one filter (kernel) is applied to input may be defined by a feature map, and this feature map may be represented by a one-dimensional (1D), two-dimensional (2D), or three-dimensional (3D) array.

Here, a 2D feature map may be represented by a horizontal size (width) and a vertical size (height), and a 3D feature map may be represented by a horizontal size, a vertical size, and a channel size. Further, the number of features (feature values) of the 2D feature map may be a multiplication of a horizontal size and a vertical size, and the number of features (feature values) of the 3D feature map may be a multiplication of a horizontal size, a vertical size, and a channel size.

As illustrated in FIG. 1, the meta-structure of a neural network may have a form including one of a feature extractor and a box classifier, wherein the feature extractor may be at least one of a VGGNet, Inception, Resnet, and a Feature Pyramid Network (FPN).

Figure 2:
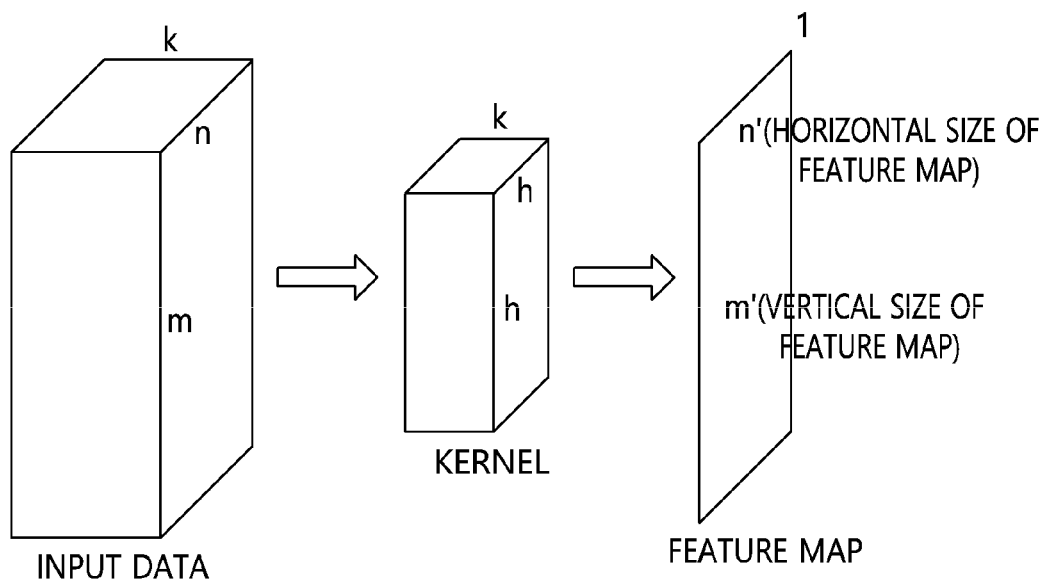
FIG. 2 is a diagram illustrating an example of a convolution operation of outputting a feature map (2D Array)

In an example, referring to FIG. 2, result values that are output when one filter (kernel) is applied to input data in a neural network may be defined by a 2D feature map. The 2D feature map illustrated in FIG. 2 may correspond to a form having a horizontal size of n', a vertical size of m', and one channel.

Figure 3:
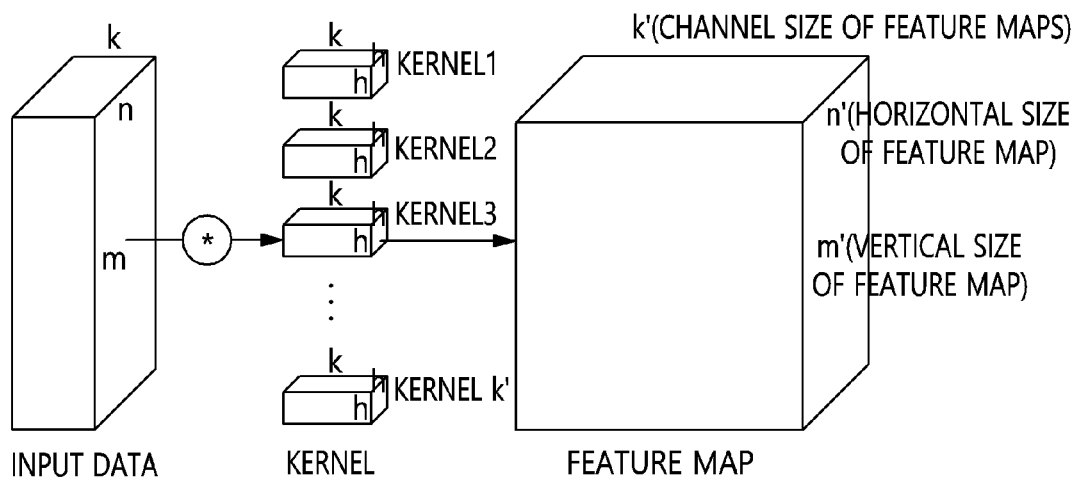
FIG. 3 is a diagram illustrating an example of a convolution operation of outputting a feature map (3D Array)

In another example, referring to FIG. 3, result values that are output when several filters (kernels) are applied to input data in a neural network may be defined by a 3D feature map. The 3D feature map illustrated in FIG. 3 may correspond to a form having a horizontal size of n', a vertical size of m', and a channel size of k' (i.e., K' channels).

Figure 4:
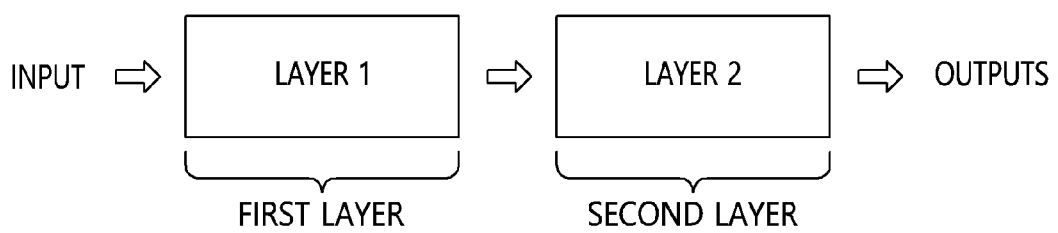
FIGS. 4 and 5 are diagrams illustrating an example of a neural network constructed using multiple layers.

Further, as illustrated in FIG. 4, the neural network may be constructed using multiple layers, each of which may include at least one of a weight multiplication operation, a convolution operation, application of an activation function, and a pooling operation. Here, each of the layers constituting the neural network may have the feature map as input or output.

Figure 5:
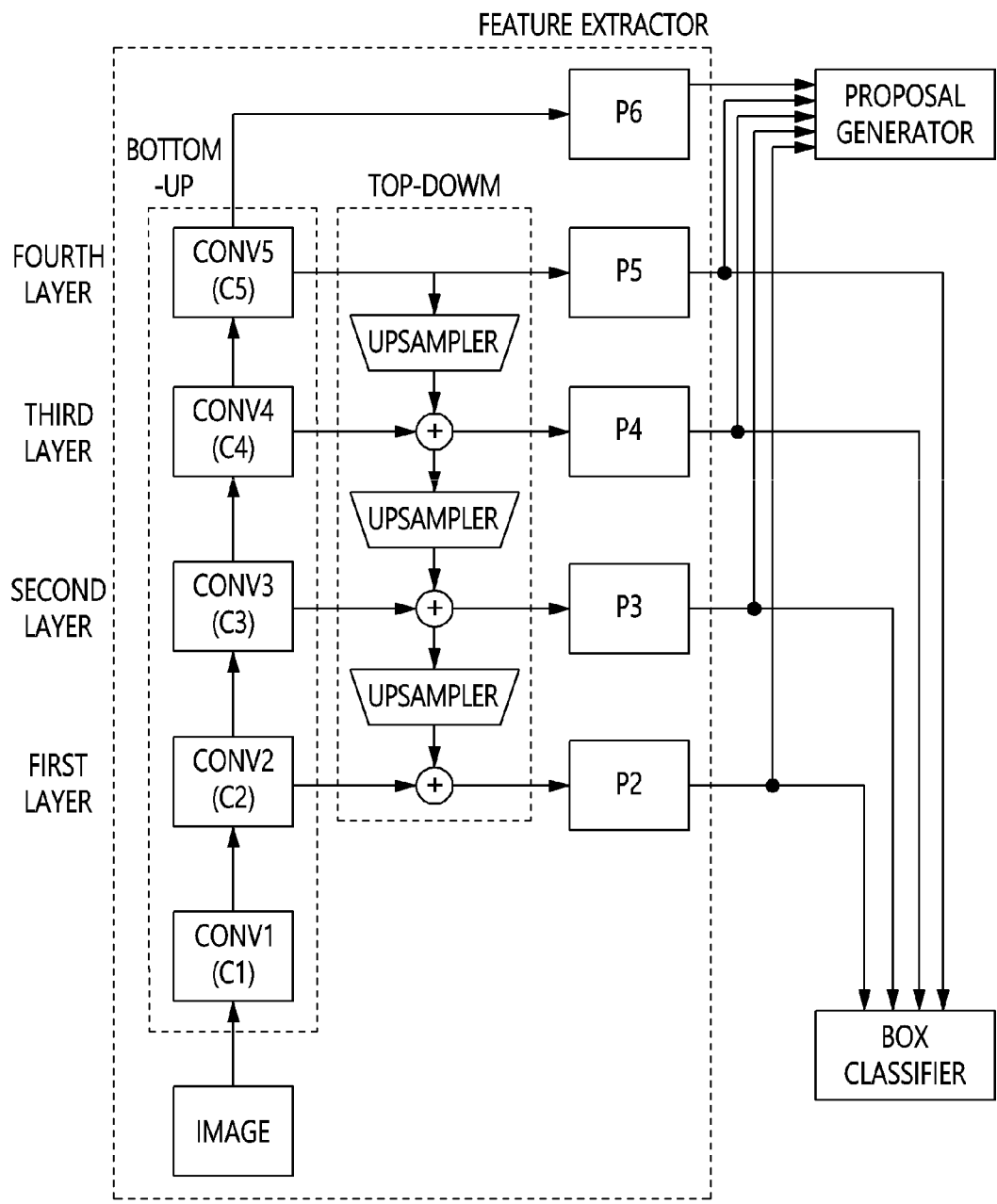

For example, the neural network may be constructed using layers from a first layer to an n-th layer. For the neural network layers configured in this way, layer numbers such as a first layer, a second layer, . . . , an n-th layer may be designated. That is, as illustrated in FIG. 5, in the neural network constructed using procedures such as a convolutional layer 1 (conv1), conv2, conv3, conv4, and conv5, the layers conv2, conv3, conv4, and conv5 may be designated as a first layer, a second layer, a third layer, and a fourth layer, respectively.

The present invention, which will be described below, intends to propose feature map encoding and decoding technology for effectively inputting/outputting a feature map in respective layers configuring the above-described neural network.

Figure 6:
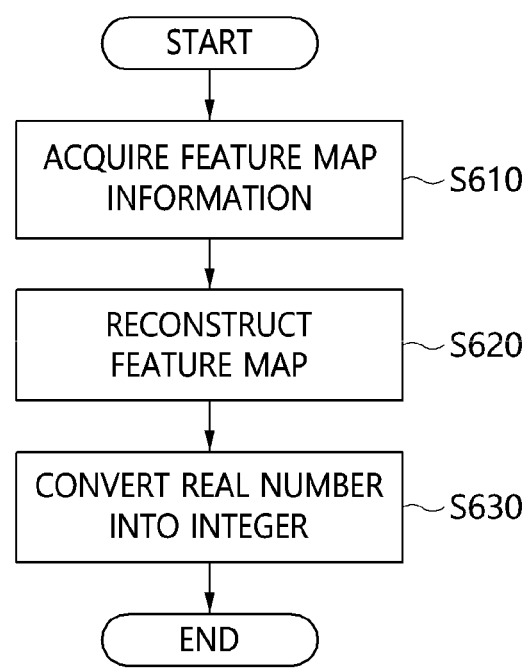
FIG. 6 is an operation flowchart illustrating a feature map encoding method according to an embodiment of the present invention.

FIG. 6 is an operation flowchart illustrating a feature map encoding method according to an embodiment of the present invention.

Referring to FIG. 6, the feature map encoding method according to the embodiment of the present invention acquires feature map information corresponding to a feature map at step S610.

Here, the feature map may be an encoding target, and may correspond to output from a specific layer configuring a neural network.

Here, the feature map information may include at least one of a neural network layer number, the horizontal length of the feature map, the vertical length of the feature map, the channel length of the feature map, the channel number of the feature map, and the channel difference of the feature map.

For example, the feature map information may be acquired through syntax elements that are signaled to correspond to NN_layer_idx, feature_map_width, feature_map_height, feature_map_channel, channel_idx, and delta_channel_idx.

Here, the specific layer number of the neural network may be acquired using the neural network layer index NN_layer_idx. In an example, the value of NN_layer_idx in the first layer illustrated in FIG. 4 may be 0, and the value of NN_layer_idx in the second layer may be 1. In another example, conv2 (C2) shown in FIG. 5 is the first layer, and thus the value of NN_layer_idx may be 0, whereas conv3 (C3) is the second layer, and thus the value of NN_layer_idx may be 1.

Therefore, the corresponding layer of the neural network may be inferred from the neural network layer index NN_layer_idx, and the layer number of the neural network may be acquired based on the inferred value.

That is, in the neural network illustrated in FIG. 4, when the value of NN_layer_idx is 0, it may be determined that the corresponding layer is the first layer, and then the layer number of the neural network may be 0, whereas when the value of NN_layer_idx is 1, it may be determined that the corresponding layer is the second layer, and then the layer number of the neural network may be 1. Further, in the neural network illustrated in FIG. 5, when the value of NN_layer_idx is 0, it may be determined that the corresponding layer is the first layer, that is, conv2(C2), and then the layer number of the neural network may be 0, whereas when the value of NN_layer_idx is 1, it may be determined that the corresponding layer is the second layer, that is, conv3(C3), and then the layer number of the neural network may be 1.

Consequently, based on the neural network layer index NN_layer_idx, a neural network layer, the feature map of which corresponds to a currently input feature map, may be determined.

In an example, based on the neural network illustrated in FIG. 4, when the value of NN_layer_idx of the feature map is 0, it may be determined that the currently input feature map is the feature map of the first layer, and when the value of NN_layer_idx of the feature map is 1, it may be determined that the currently input feature map is the feature of the second layer.

In another example, based on the neural network illustrated in FIG. 5, when the value of NN_layer_idx of the feature map is 0, it may be determined that the currently input feature map is the feature map of the conv2(C2) layer, which is the first layer, and when the value of NN_layer_idx of the feature map is 1, it may be determined that the currently input feature map is the feature of the conv3(C3) layer, which is the second layer.

Here, the horizontal length of the feature map, the vertical length of the feature map, and the channel length of the feature map may be represented by feature_map_width, feature_map_height, and feature_map_channel, respectively.

In an example, as illustrated in FIG. 2, when a 2D feature map is constructed using horizontal n' feature values and vertical m' feature values, the horizontal length of the feature map may be n', and the vertical length of the feature map may be m'. That is, feature_map_width may be n', and feature_map_height may be m'.

In another example, as illustrated in FIG. 3, when a 3D feature map is constructed using horizontal n' feature values, vertical m' feature values, and channel k' feature values, the horizontal length of the feature map may be n', the vertical length of the feature map may be m', and the channel length of the feature map may be k'. That is, feature_map_width may be n', feature_map_height may be m', and feature map channel may be k'.

Therefore, the horizontal length of the feature map, the vertical length of the feature map, and the channel length of the feature map may be inferred based on values respectively corresponding to feature_map_width, feature_map_height, and feature_map_channel.

In this case, NN_layer_idx, feature_map_width, feature_map_height, feature_map_channel, channel_idx, and delta_channel_idx corresponding to the feature map information may be signaled to an apparatus for encoding and decoding the feature map.

Therefore, the feature map encoding apparatus or the feature map decoding apparatus according to an embodiment of the present invention may acquire feature map information corresponding to the neural network layer number, feature map horizontal length, feature map vertical length, feature map channel length, feature map channel number, and feature map channel difference of the feature map currently desired to be encoded or decoded, based on the signaled NN_layer_idx, feature_map_width, feature_map_height, feature_map_channel, channel_idx, and delta_channel_idx.

If the value of feature_map_width is not signaled, it may be determined that the horizontal length of the feature map currently desired to be encoded or decoded is 1. Also, if the value of feature_map_height is not signaled, it may be determined that the vertical length of the feature map currently desired to be encoded or decoded is 1. Further, if the value of feature_map_channel is not signaled, it may be determined that the channel length of the feature map currently desired to be encoded or decoded is 1.

Here, the horizontal length of the feature map may correspond to the number of columns in the feature map, and the vertical length of the feature map may correspond to the number of rows in the feature map. Further, the channel length of the feature map may correspond to the depth value of the feature map.

Meanwhile, the feature map encoding method according to the embodiment of the present invention reconstructs the feature map based on the feature map information at step S620.

Here, the feature map may be constructed using a predetermined number of channels. For example, the channels of the feature map may include a first feature map channel, a second feature map channel, etc., and may be designated using ordinal numbers such as "first feature map channel" and "second feature map channel".

Figure 7:
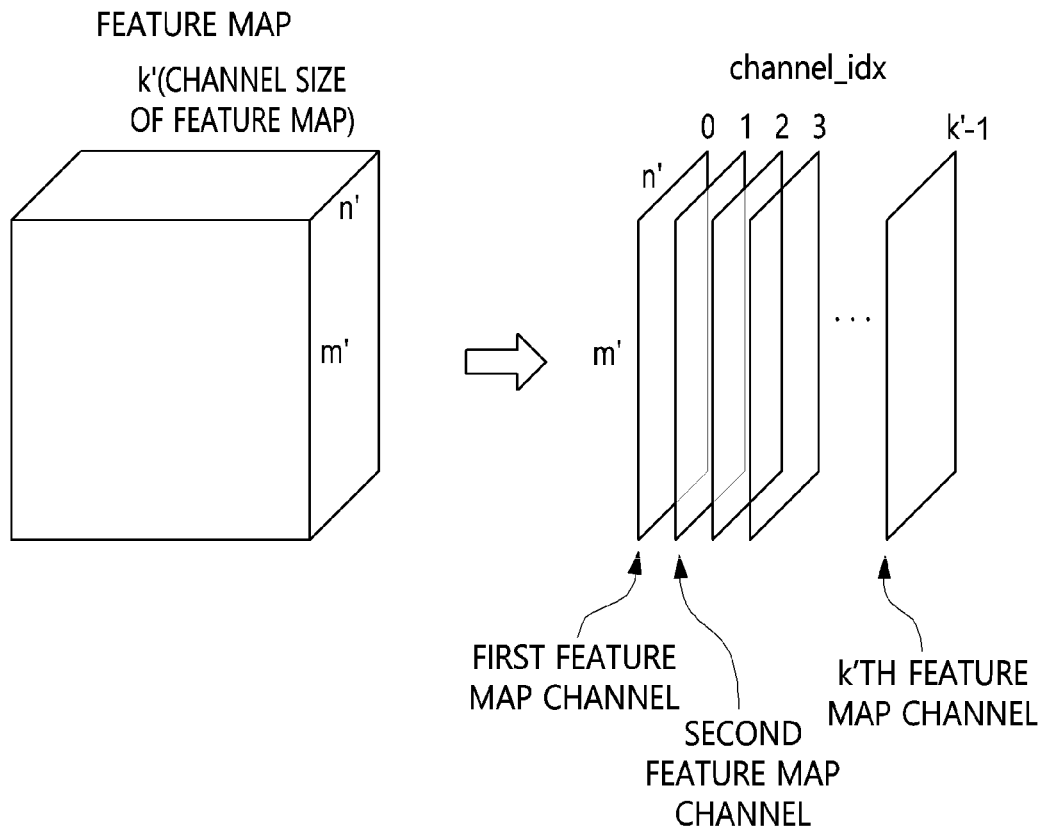
FIG. 7 is a diagram illustrating an example of a feature map channel according to the present invention.

Referring to FIG. 7, the illustrated feature map may be constructed using k' channels. Here, a 1st feature map channel may be designated as a first feature map channel, a 2nd feature map channel may be designated as a second feature map channel, and a last feature map channel may be designated as a k'-1-th feature map channel. Here, k' may be a predetermined number, and channel_idx may correspond to the number of the corresponding channel in the feature map.

Here, a specific feature map channel or a specific feature map channel number may be designated using the feature map channel index channel_idx included in the feature map information.

For example, because, in FIG. 7, the value of channel index channel_idx of the first feature map channel is 0 and the channel index channel_idx of the second feature map channel is 1, the channel of the feature map, which corresponds to a certain channel, may be inferred based on the feature map channel index channel_idx.

In this case, at least one of the range and the maximum value of channel_idx may be inferred through the value of feature_map_channel.

For example, in FIG. 7, since the value of feature_map_channel is k', channel_idx may have the values of 0, 1, 2, . . . , k'-1, and the maximum value of channel_idx may be k'-1. When the value of feature_map_channel is 1, channel_idx may have only a value of 0, and thus the maximum value of channel_idx may also be 0.

In this way, an arbitrary channel used to constitute the feature map may have the value of channel_idx, and which channel of the feature map corresponds to the arbitrary channel may be inferred.

For example, in FIG. 7, it may be determined that a channel for which the value of channel_idx is 1 is the second feature map channel, among channels currently constituting the feature map. That is, when the value of the signaled channel_idx is 'a', it may be determined that the feature map channel currently desired to be encoded or decoded is an a+1-th feature map channel, and the feature map channel number of the corresponding channel is 'a'.

Further, according to the present invention, the current feature map channel may be determined using a delta channel index delta_channel_idx.

Here, the delta channel index delta_channel_idx may be a value indicating the difference in the feature map channel number of the current feature map channel, and may be defined by the difference value between the feature map channel number of a reference feature map channel and the feature map channel number of the current feature map channel. Here, the reference feature map channel may be a k-th feature map channel or a previous feature map channel. The previous feature map channel may be a previously signaled feature map channel or a previously encoded/decoded feature map channel.

In an example, when the reference feature map channel is the previous (past) feature map channel past_channel, the difference between the feature map channel number of the previous feature map channel past_channel_idx and the feature map channel number of the current (present) feature map channel present_channel_idx, that is, |past_channel_idx−present_channel_idx|, may correspond to the difference in the feature map channel number delta_channel_idx of the current feature map channel.

In another example, when the reference feature map channel is a p-th feature map channel p_channel, the difference between the feature map channel number of the p-th feature map channel p_channel_idx and the feature map channel number of the current feature map channel present_channel_idx, that is, |p_channel_idx−present_channel_idx|, may correspond to the difference in the feature map channel number delta_channel_idx of the current feature map channel.

In this case, the feature map encoding apparatus or the feature map decoding apparatus according to an embodiment of the present invention may check, based on the signaled information, whether the reference feature map channel is the previous feature map channel or the p-th feature map channel.

In this case, when the reference feature map channel is the previous feature map channel, the feature map channel number channel_idx of the current feature map channel may be inferred by adding the feature map channel number channel_idx of the previous feature map channel to the difference delta_channel_idx in the feature map channel number of the current feature map channel.

Alternatively, when the reference feature map channel is the p-th feature map channel, the feature map channel number channel_idx of the current feature map channel may be inferred by adding the feature map channel number channel_idx of the p-th feature map channel to the difference delta_channel_idx in the feature map channel number of the current feature map channel.

That is, the feature map channel currently desired to be encoded or decoded may have the value of delta_channel_idx. Also, based on the value of delta_channel_idx, which one of feature map channels is the feature map channel that is currently desired to be encoded or decoded may be known, and the feature map channel number may be inferred.

In this case, the range of the value of delta_channel_idx or the maximum or minimum value of the value of delta_channel_idx may be inferred through the value of feature_map_channel.

For example, as shown in FIG. 7, it can be seen that, when the value of feature_map_channel is k', the range of delta_channel_idx may be from −k' to k'. Also, the maximum value of delta_channel_idx may be k', and the minimum value thereof may be −k'.

If the value of feature_map_channel is 1, the number of channels constituting the feature map is only one, and thus the value of delta_channel_idx may be inferred to be 0.

Figure 8:
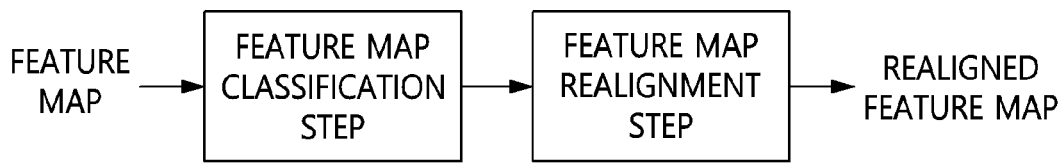
FIG. 8 is a diagram illustrating an example of a feature map reconstruction process according to the present invention.

Here, the reconstruction process according to the present invention may be performed based on the feature map that is realigned after passing through a feature map classification step and a feature map realignment step, as illustrated in FIG. 8.

Here, the feature map classification step may be configured to classify feature maps depending on the feature values of the feature map, and the feature map realignment step may be configured to change the order of features of the feature map.

In the present invention, at least one of the feature map classification step and the feature map realignment step may not be performed according to the number of feature map channels feature_map_channel.

For example, when the number of feature map channels is 1, realignment is meaningless, and thus the feature map classification step and the feature map realignment step may not be performed.

In this case, when the feature map is constructed using multiple channels, the multiple channels may be classified into one or more feature map channel groups.

For example, k' feature map channels may be classified into a first feature map channel group, a second feature map channel group, . . . , a P-th feature map channel group according to the mutual similarity between the feature map channels. Here, P may be a predetermined positive number.

In this case, the multiple channels may be classified into one or more feature map channel groups using a clustering algorithm.

Figure 9:
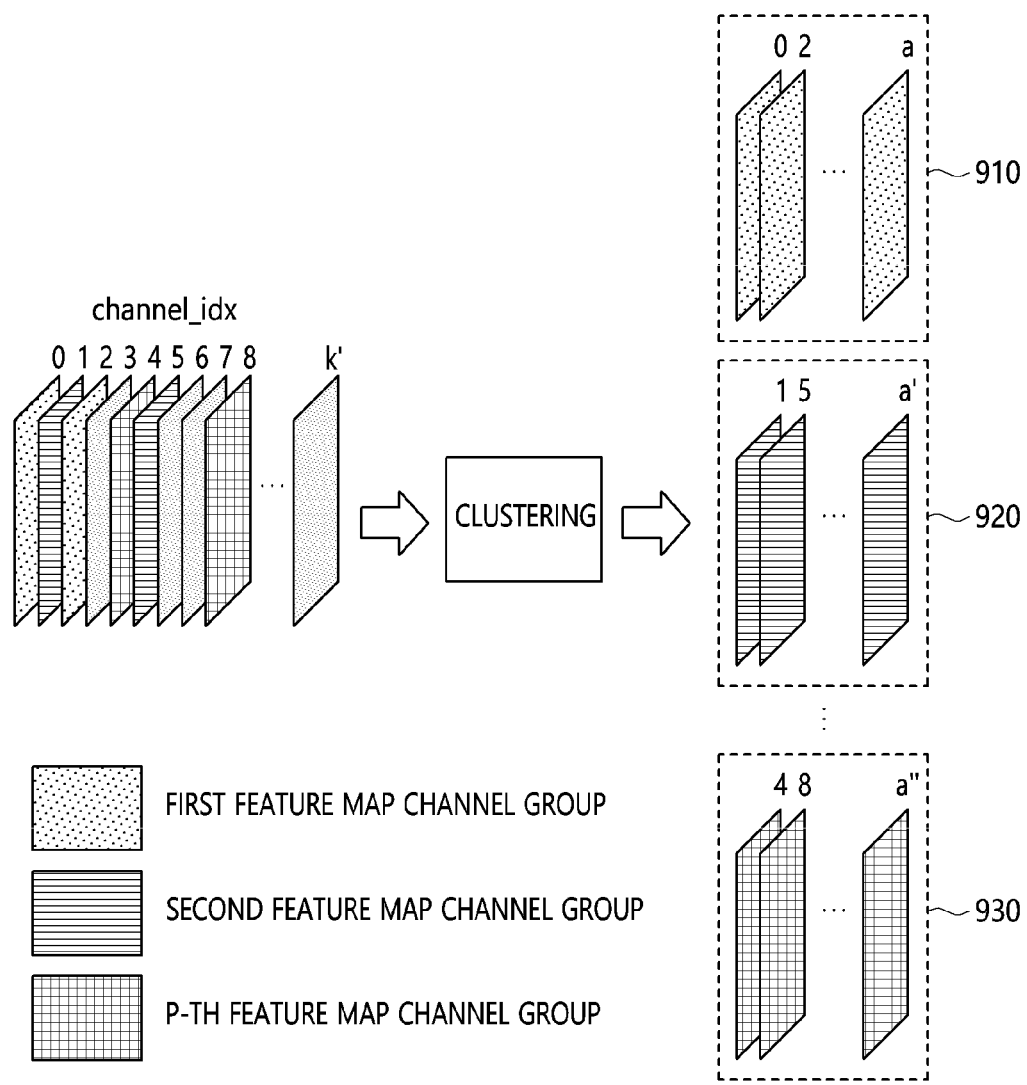
FIG. 9 is a diagram illustrating an example of a process for generating a feature map channel group according to the present invention.

For example, as illustrated in FIG. 9, k' feature map channels may be classified into P feature map channel groups using a clustering algorithm. In this case, a k-means algorithm or an affinity propagation algorithm may be used as the clustering algorithm.

Here, the sum of the numbers of feature map channels respectively belonging to P feature map channel groups may be equal to the original number of channels. That is, referring to FIG. 9, the sum of the numbers of all channels included in respective groups from a first feature map channel group 910 to a P-th feature map channel group 930 may be k', that is, (0~a)+(1~−a')+ . . . +(4~a")=0~k'.

Here, similarities between the feature value of a reference channel and respective feature values of the multiple channels may be determined, and the multiple channels may be classified in descending order of similarities.

For example, similarities between the k' feature map channels and the reference channel may be determined, and thus the k' channels may be classified in the order of the most similar feature map channel, the next most similar feature map channel, . . . , the k'-th most similar feature map channel, etc.

That is, assuming that the reference channel is the first feature map channel, the k' channels may be classified in the order of a feature map channel that is most similar to the reference channel, a feature map channel that is next most similar to the reference channel, . . . , a feature map channel that is k'-th most similar to the reference channel, etc. using at least one of the peak signal-to-noise ratio (PSNR) and mean-square error (MSE).

In this case, the multiple classified channels may be realigned in the order of feature map channel groups or in descending order of similarities.

Here, the term "realignment" may correspond to the change in the order of features in the feature map.

Figure 10:
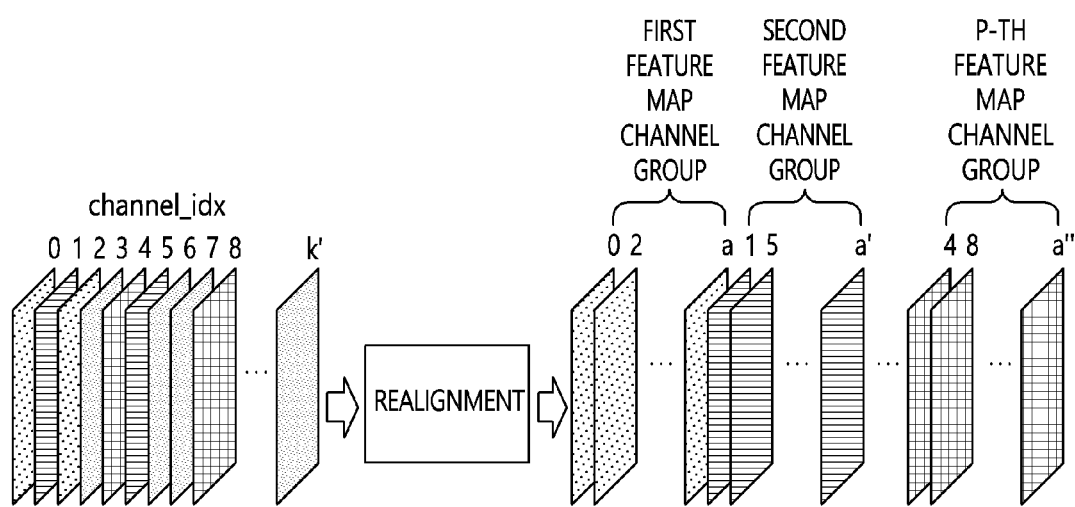
FIG. 10 is a diagram illustrating an example of a process for realigning a feature map according to the present invention.

For example, as illustrated in FIG. 10, k' feature map channels may be realigned in the order of a first feature map channel group, a second feature map channel group, . . . , a P-th feature map channel group.

Here, the multiple realigned channels may be reconstructed into one feature map channel.

Here, the one feature map channel may correspond to a matrix form having a preset size.

In this case, the realigned multiple channels may be sequentially input to the matrix values of one feature map channel.

Figure 11:
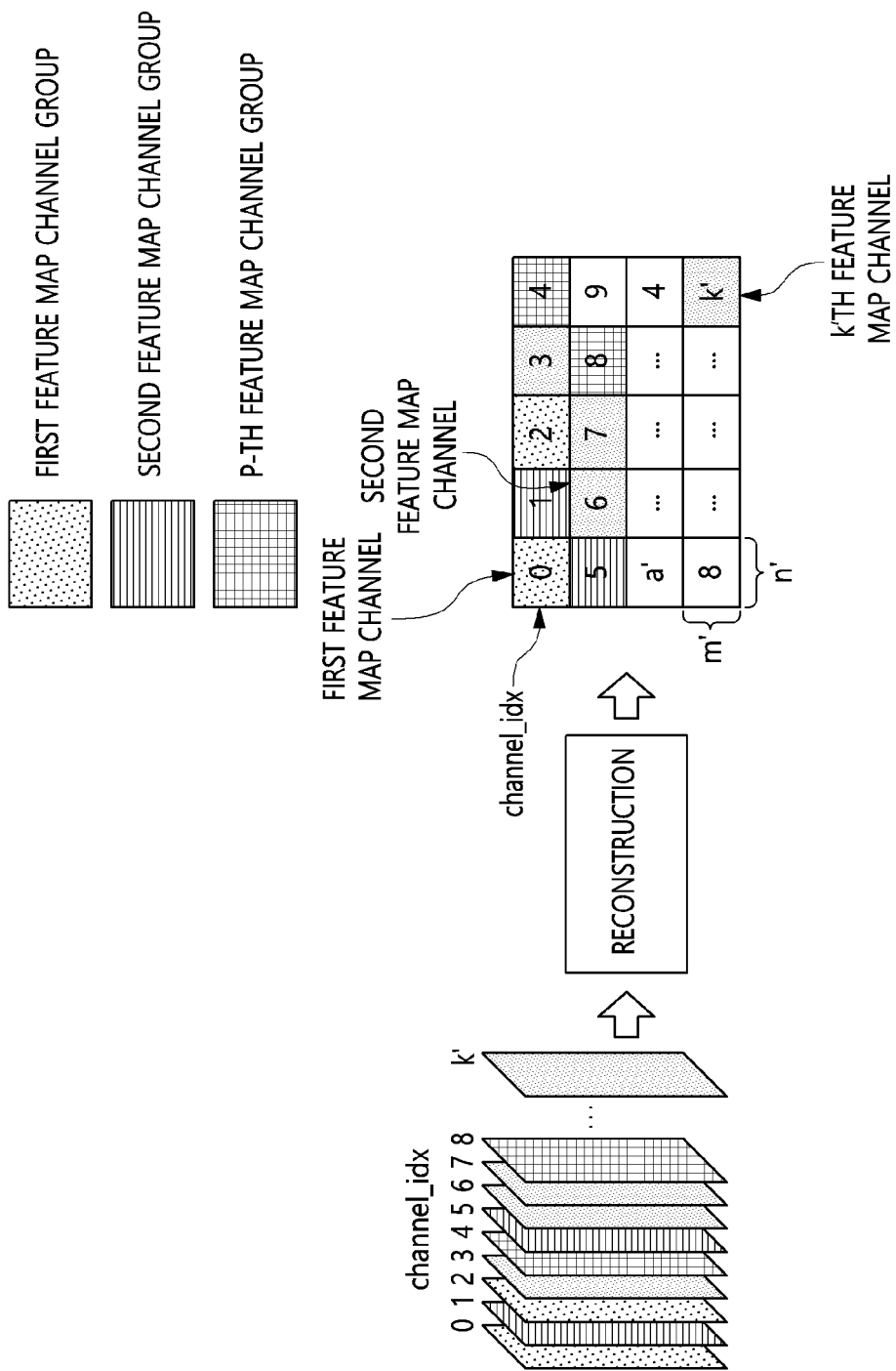
FIGS. 11 and 12 are diagrams illustrating an example of a process for reconstructing a feature map according to the present invention.

For example, as illustrated in FIG. 11, k' feature map channels are reconstructed into one feature map channel (sheet) so that the k' feature map channels are sequentially assembled in a matrix form having a row size and a column size corresponding to the one feature map channel sheet. Here, in the feature map reconstructed into one channel sheet, a row value is the number of feature map channels arranged in a vertical direction before being reconstructed, and a column value is the number of feature map channels arranged in a horizontal direction before being reconstructed. In FIG. 11, because the column value is 5 and the total number of feature map channels is k', the row value may be k'/5.

In this manner, a 3D array-type feature map may be reconstructed into a 2D array-type feature map.

Here, the k' feature map channels illustrated in FIG. 11 may be realigned in descending order of similarities to the reference channel, and may then be reconstructed into one feature map channel sheet. That is, the feature map channels may be input to the matrix having a row size and a column size corresponding to one feature map channel sheet in the order of a feature map channel that is most similar to the reference channel, a feature map channel that is next most similar to the reference channel, . . . , a feature map channel that is k'-th most similar to the reference channel, among the k' channels.

Figure 12:
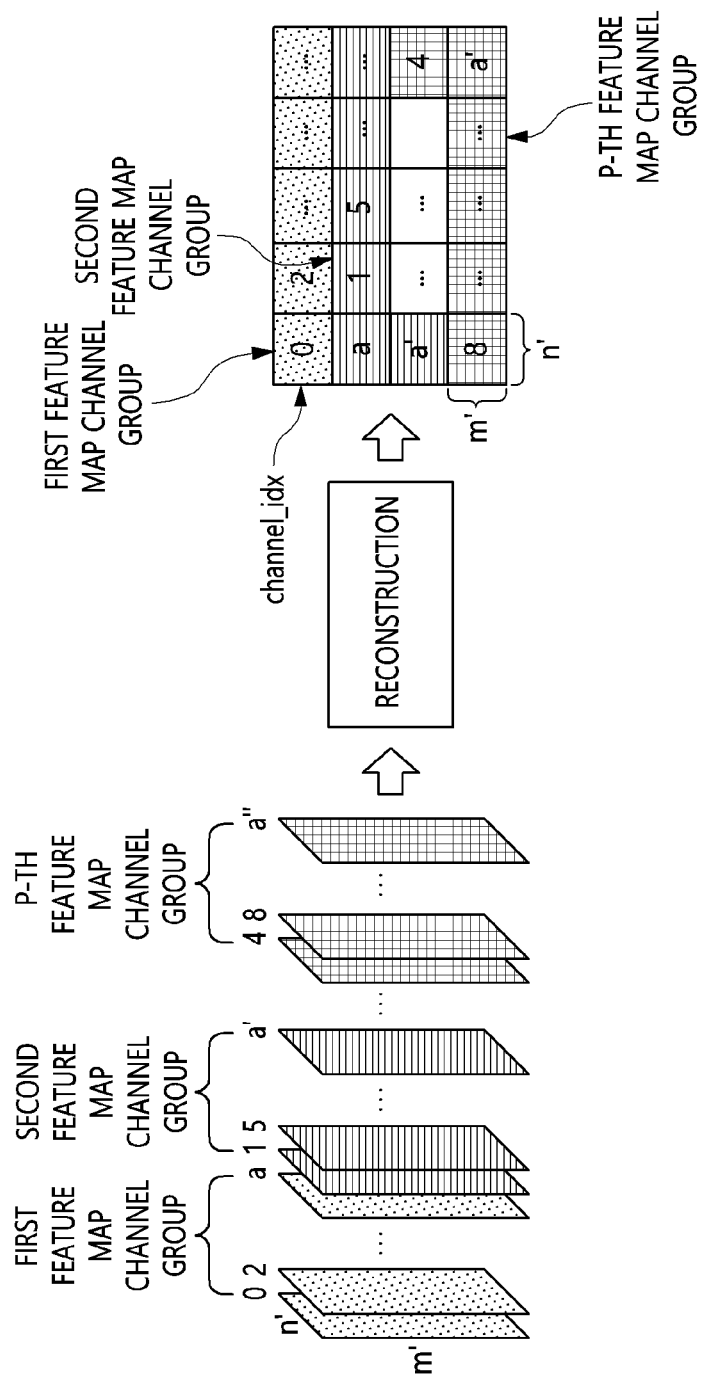

In another example, as illustrated in FIG. 12, k' feature map channels realigned for respective feature map channel groups may be sequentially assembled in a matrix form having a row size and a column size corresponding to one feature map channel sheet. That is, feature map channels in a first feature map channel group, feature map channels in a second feature map channel group, . . . , feature map channels in a P-th feature map channel group may be sequentially assembled in the form of one feature map channel sheet, and thus the feature map may be reconstructed.

Here, the realigned k' feature map channels may be assembled to the feature map channel sheet from the location subsequent to the reference channel.

Referring to Equation (1), the row size and the column size corresponding to one feature map channel sheet may be inferred based on the value of feature_map_channel.

$$\exp = \log_2 \text{feature\_map\_channel}$$

$$\text{row} = 2^{\exp(-\exp >> 1)}$$

$$\text{column} = 2^{\exp >> 1} \quad (1)$$

Next, the feature map encoding method according to the embodiment of the present invention generates an encoded feature map by converting each feature value corresponding to the reconstructed feature map from a real number into an integer at step S630.

Generally, in the neural network structure, each feature (feature value) of the feature map may be represented by one of a real number and an integer having a predetermined range.

For example, when there is one feature map channel, the feature map is constructed using a predetermined number of feature values, and the predetermined number may be n'*m'.

Here, the range of the real number may be the range of $2^{128}$ to $2^{-128}$, and the range of the integer may be one of the range of 0 to 255, the range of 0 to 511, and the range of 0 to 1023.

In this case, in the encoding process according to an embodiment of the present invention, the feature (value) of the feature map may be converted from a real number into an integer, after which encoding may be performed thereon.

Here, each feature value may be converted from a real number into an integer through a normalization procedure that uses at least one of the average of feature values, the variance of feature values, the minimum value of a range after conversion, and the maximum value of the range after conversion.

For example, as shown in the following Equation (2), a predetermined real number feature value may be converted to correspond to an integer feature value 'a' ranging from 0 to 255 through a normalization procedure that uses at least one of the average of feature values cast_avg, the variance of feature values cast_var, the minimum value of the range after conversion cast_min, and the maximum value of the range after conversion cast_max.

$$a = \text{real number feature value} - \text{cast\_avg}$$

$$a = a/\text{cast\_var}$$

$$a = a*64$$

$$a = a+128$$

$$a = \text{clip}(a, \text{cast\_min}, \text{cast\_max}) \quad (2)$$

Here, the average of feature values cast_avg may correspond to the average of feature values in the entire feature map or one feature map channel.

Here, the variance of feature values cast_var may correspond to the variance of feature values in the entire feature map or one feature map channel.

Here, after conversion of the real number into the integer, the range of the integer may correspond to the range between the minimum value of the range after conversion cast_min and the maximum value of the range after conversion cast_max.

Therefore, in order to encode the feature map, the present invention may signal at least one of the average of feature values, the variance of feature values, the minimum value of the range after conversion, and the maximum value of the range after conversion.

In this case, whether the feature map information acquisition step S610, the feature map reconstruction step S620, and the real number-integer conversion step S630 illustrated in FIG. 6 are to be performed may be determined based on at least one of feature_map_layer_idx, feature_map_width, feature_map_height, feature_map_channel, channel_idx, delta_channel_idx, cast_avg, cast_var, cast_min, cast_max, a coding parameter, picture information, slice information, a quantization parameter (QP), a coding block flag (CBF), a block size, a block depth, a block shape, an entropy coding method, an intra-picture prediction mode for a neighboring block, and a temporal layer level. Furthermore, the order of operation of the feature map information acquisition step S610, the feature map reconstruction step S620, and the real number-integer conversion step S630 is not limited to that illustrated in FIG. 6, but may be changed if necessary.

By means of this feature map encoding method, the feature map may be effectively encoded in the feature extraction process using a neural network model.

Furthermore, the feature map may be effectively encoded, and the encoded feature map may be effectively utilized in the neural network.

Figure 13:
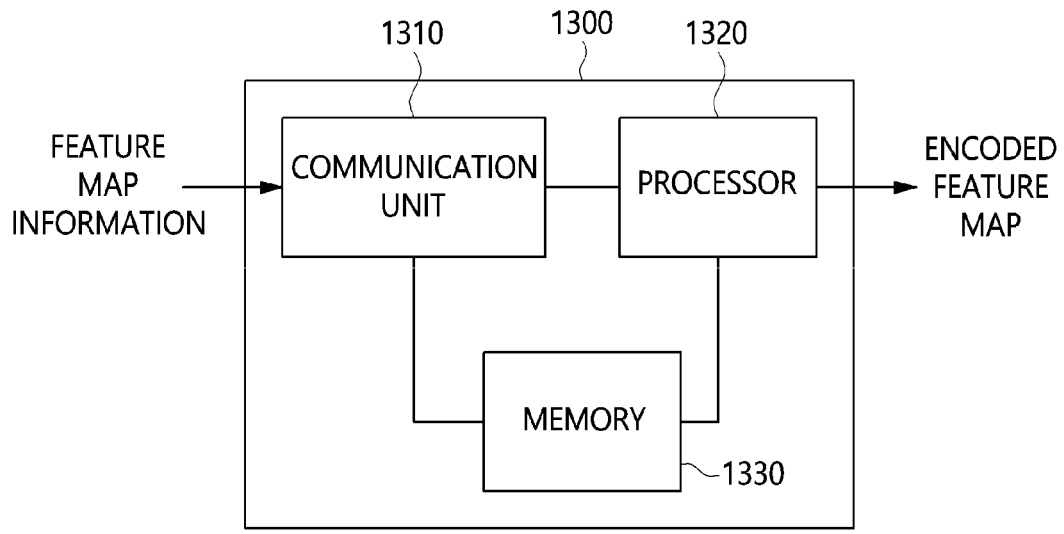
FIG. 13 is a block diagram illustrating a feature map encoding apparatus according to an embodiment of the present invention.

FIG. 13 is a block diagram illustrating a feature map encoding apparatus according to an embodiment of the present invention.

Referring to FIG. 13, a feature map encoding apparatus 1300 according to the embodiment of the present invention includes a communication unit 1310, a processor 1320, and memory 1330.

The communication unit 1310 may function to transmit and receive information required for the feature map encoding through a communication network such as a typical network. Here, the network provides a path through which data is delivered between devices, and may be conceptually understood to encompass networks that are currently being used and networks that have yet to be developed.

For example, the network may be an IP network, which provides service for transmission and reception of a large amount of data and uninterrupted data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a High-Speed Downlink Packet Access (HSDPA) network, a 3.5G mobile communication network including an LTE network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 1320 may acquire feature map information corresponding to a feature map.

Here, the feature map information may include at least one of the layer number of a neural network, the horizontal length of the feature map, the vertical length of the feature map, the channel length of the feature map, the channel number of the feature map, and the channel difference of the feature map.

Further, the processor 1320 reconstructs the feature map based on the feature map.

Here, when the feature map is constructed using multiple channels, the multiple channels may be classified into one or more feature map channel groups.

Here, similarities between the feature value of a reference channel and respective feature values of the multiple channels may be determined, and the multiple channels may be classified in descending order of similarities.

In this case, the multiple classified channels may be realigned in the order of feature map channel groups or in descending order of similarities.

Here, the realigned multiple channels may be reconstructed into one feature map channel.

Here, the one feature map channel may correspond to the form of a matrix having a preset size.

In this case, the realigned multiple channels may be sequentially input to the matrix values of one feature map channel.

Also, the processor 1320 generates an encoded feature map by converting each feature value corresponding to the reconstructed feature map from a real number into an integer.

At this time, each feature value may be converted from a real number into an integer through a normalization procedure that uses at least one of the average of feature values, the variance of feature values, the minimum value of a range after conversion, and the maximum value of the range after conversion.

The memory 1330 stores the feature map information.

Further, the memory 1330 stores various types of information generated by the feature map encoding apparatus 1300 according to the embodiment of the present invention, as described above.

In accordance with an embodiment, the memory 1330 may be configured independently of the feature map encoding apparatus 1300 to support functions for feature map encoding. Here, the memory 1330 may function as separate mass storage, or may include a control function for performing operations.

Meanwhile, the feature map encoding apparatus 1300 may include memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

By utilizing the feature map encoding apparatus, the feature map may be effectively encoded in the feature extraction process using a neural network model.

Furthermore, the feature map may be effectively encoded, and the encoded feature map may be effectively utilized in the neural network.

Figure 14:
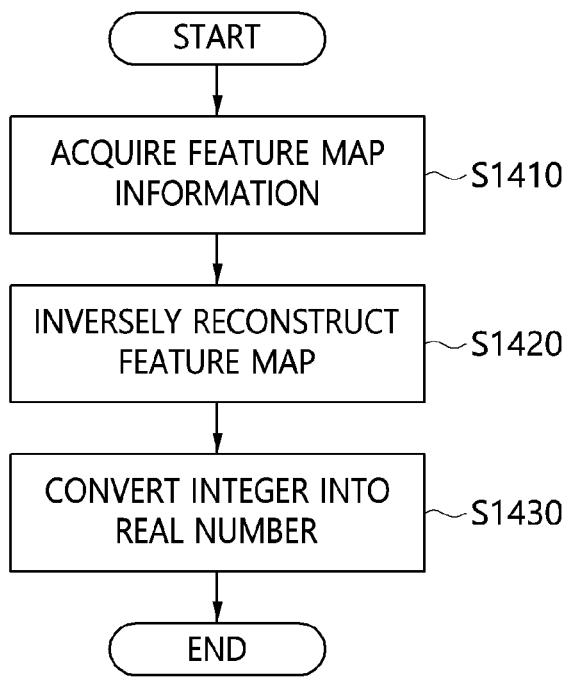
FIG. 14 is an operation flowchart illustrating a feature map decoding method according to an embodiment of the present invention.

FIG. 14 is an operation flowchart illustrating a feature map decoding method according to an embodiment of the present invention.

Referring to FIG. 14, the feature map decoding method according to the embodiment of the present invention acquires feature map information corresponding to an encoded feature map at step S1410.

Here, the feature map information may include at least one of the layer number of a neural network, the horizontal length of the feature map, the vertical length of the feature map, the channel length of the feature map, the channel number of the feature map, and the channel difference of the feature map.

Here, because step S1410 is similar to step S610 of FIG. 6, a detailed description thereof will be omitted.

Further, the feature map decoding method according to the embodiment of the present invention inversely reconstructs the encoded feature map based on the feature map information at step S1420.

In this case, one feature map channel corresponding to a matrix form having a preset size may be divided into multiple channels based on the horizontal length of the feature map and the vertical length of the feature map.

Figure 15:
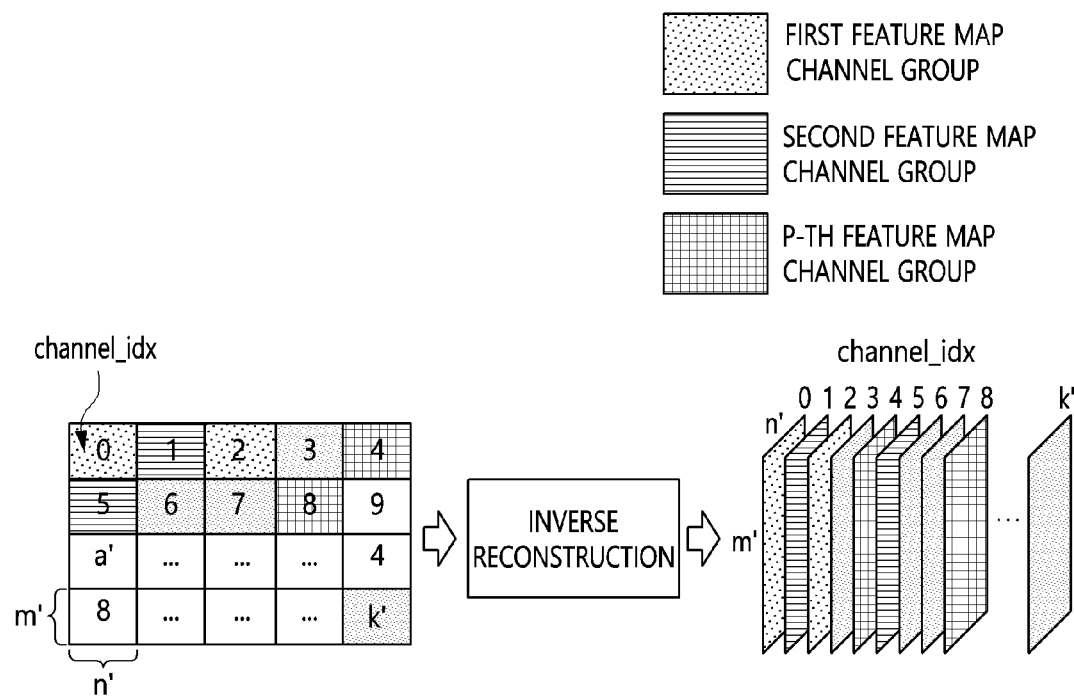
FIGS. 15 and 16 are diagrams illustrating an example of a process for inversely reconstructing a feature map according to the present invention.

For example, as illustrated in FIG. 15, the horizontal length (width) of one feature map channel sheet is divided into units of the feature map horizontal length feature_map_width and the vertical length (height) of one feature map channel is divided into units of the feature map vertical length feature_map_height, and thus k' feature map channels may be acquired. The k' feature map channels acquired in this way may be configured in one line in the order of channel numbers, and then a 3D feature map corresponding to the original feature map may be reconstructed.

Figure 16:
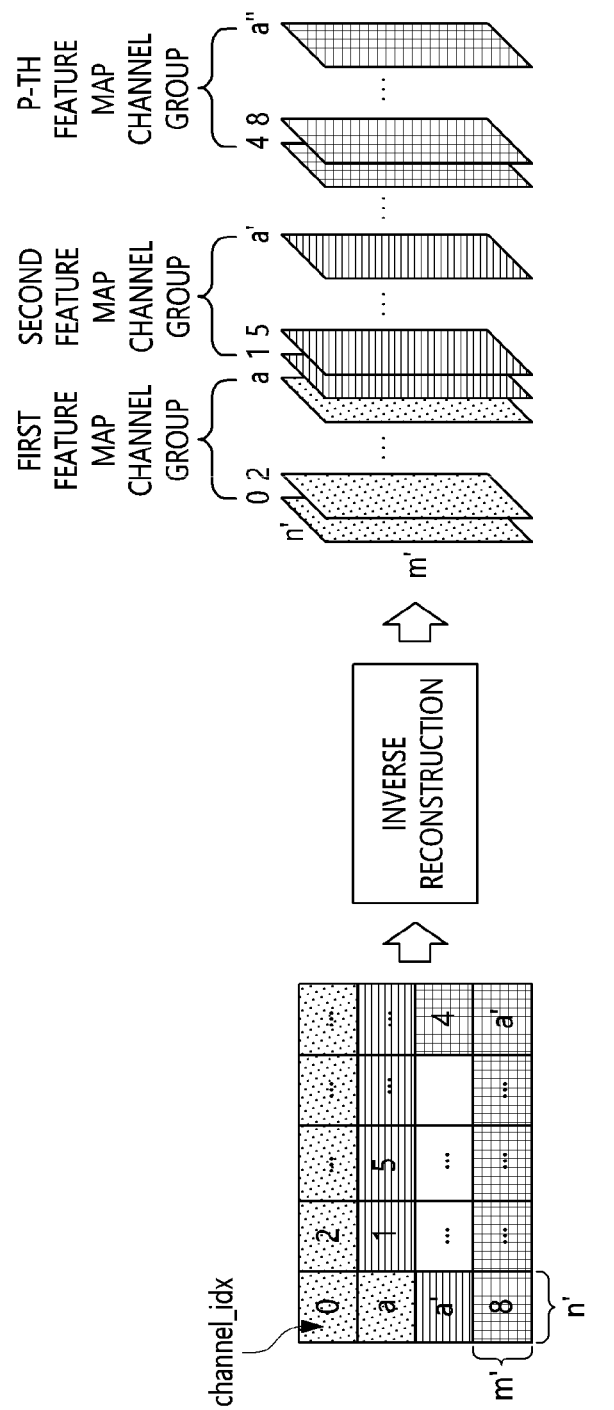

In another example, as illustrated in FIG. 16, the horizontal length (width) of one feature map channel sheet is divided into units of the feature map horizontal length feature_map_width and the vertical length (height) of one feature map channel is divided into units of the feature map vertical length feature_map_height, and thus k' feature map channels may be acquired. The k' feature map channels acquired in this way may be configured in the order of feature map channel groups, and then a 3D feature map corresponding to the original feature map may be reconstructed.

Here, the channel numbers may be inferred and known based on channel_idx or delta_channel_idx.

In this case, multiple channels may be inversely realigned in the order of feature map channel numbers.

Figure 17:
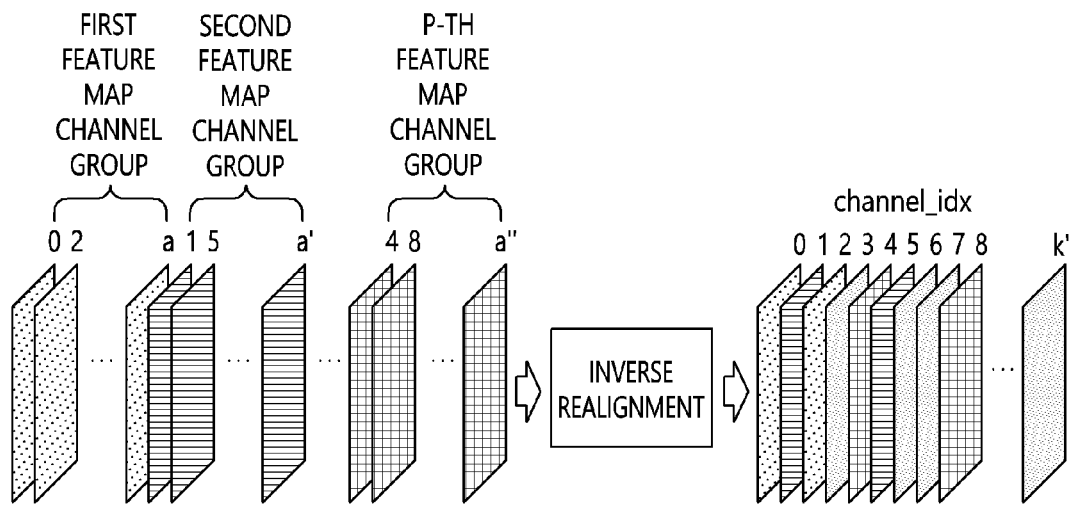
FIG. 17 is a diagram illustrating an example of a process for inversely realigning a feature map according to the present invention.

In an example, as illustrated in FIG. 17, multiple channels may be inversely realigned in ascending order of feature map channel numbers using channel_idx, and thus the original feature map may be reconstructed. That is, inverse realignment may be performed in the order of a first feature map channel, a second feature map channel, . . . , a k'-th feature map channel using channel_idx.

In another example, although not illustrated in FIG. 17, a feature map channel number of each of the multiple channels may be inferred based on delta_channel_idx, and multiple channels may be inversely realigned in ascending order of the inferred feature map channel numbers.

Next, the feature map decoding method according to the embodiment of the present invention may generate a decoded feature map by converting each feature value corresponding to the inversely reconstructed feature map from an integer into a real number at step S1430.

In this case, in the decoding process according to the embodiment of the present invention, each feature (value) of the feature map may be converted from an integer into a real number, after which decoding may be performed thereon.

Here, each feature value may be converted from an integer into a real number through a normalization procedure that uses at least one of the average of feature values, the variance of feature values, the minimum value of a range after conversion, and the maximum value of a range after conversion.

For example, as shown in Equation (3), a predetermined integer feature value may be converted to correspond to a predetermined real number feature value 'b' through a normalization procedure that uses at least one of the average of feature values cast_avg, the variance of feature values cast_var, the minimum value of a range after conversion cast_min, and the maximum value of the range after conversion cast_max.

Here, the predetermined real number feature value 'b' may correspond to one of a positive real number ranging from $2^{-128}$ to $2^{128}$, 0, and a negative real number ranging from $-2^{128}$ to $-2^{128}$.

$$b=b-128$$

$$b=b/64$$

$$b=b*cast\_var$$

$$b=b+cast\_avg \qquad (3)$$

Here, the average of feature values cast_avg may correspond to the average of feature values in the entire feature map or one feature map channel.

Here, the variance of feature values cast_var may correspond to the variance of feature values in the entire feature map or one feature map channel.

Here, after conversion of the integer into the real number, the range of the real number may correspond to the range between the minimum value of the range after conversion cast_min and the maximum value of the range after conversion cast_max.

Therefore, in order to decode the feature map, the present invention may signal at least one of the average of feature values, the variance of feature values, the minimum value of the range after conversion, and the maximum value of the range after conversion.

In this case, whether the feature map information acquisition step S1410, the feature map inverse reconstruction step S1420, and the integer-real number conversion step S1430 illustrated in FIG. 14 are to be performed may be determined based on at least one of feature_map_layer_idx, feature_map_width, feature_map_height, feature_map_channel, channel_idx, delta_channel_idx, cast_avg, cast_var, cast_min, cast_max, a coding parameter, picture information, slice information, a quantization parameter (QP), a coding block flag (CBF), a block size, a block depth, a block shape, an entropy coding method, an intra-picture prediction mode for a neighboring block, and a temporal layer level. Furthermore, the order of operation of the feature map information acquisition step S1410, the feature map inverse reconstruction step S1420, and the integer-real number conversion step S1430 is not limited to the form illustrated in FIG. 14, but may be changed if necessary.

By means of this feature map decoding method, the feature map may be effectively decoded in the feature extraction process using a neural network model.

Furthermore, the feature map may be effectively decoded, and the decoded feature map may be effectively utilized in the neural network.

Figure 18:
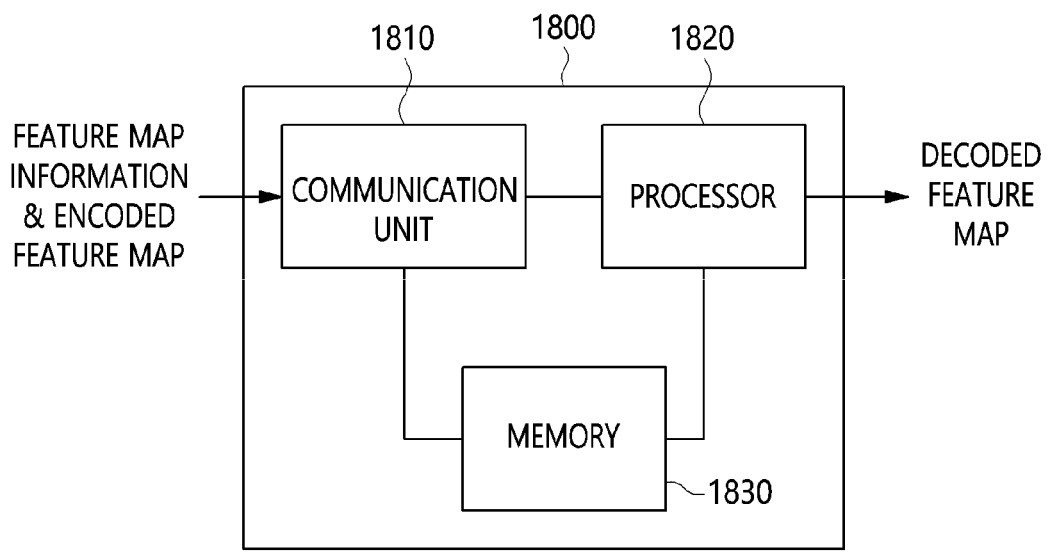
FIG. 18 is a block diagram illustrating a feature map decoding apparatus according to an embodiment of the present invention.

FIG. 18 is a block diagram illustrating a feature map decoding apparatus according to an embodiment of the present invention.

Referring to FIG. 18, a feature map decoding apparatus 1800 according to the embodiment of the present invention includes a communication unit 1810, a processor 1820, and memory 1830.

The communication unit 1810 may function to transmit and receive information required for the feature map decoding through a communication network such as a typical network. Here, the network provides a path through which data is delivered between devices, and may be conceptually understood to encompass networks that are currently being used and networks that have yet to be developed.

For example, the network may be an IP network, which provides service for transmission and reception of a large amount of data and uninterrupted data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a High-Speed Downlink Packet Access (HSDPA) network, a 3.5G mobile communication network including an LTE network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 1820 acquires feature map information corresponding to an encoded feature map.

Here, the feature map information may include at least one of a neural network layer number, the horizontal length of the feature map, the vertical length of the feature map, the channel length of the feature map, the channel number of the feature map, and the channel difference of the feature map.

Further, the processor 1820 inversely reconstructs the encoded feature map based on the feature map information.

In this case, one feature map channel corresponding to a matrix form having a preset size may be divided into multiple channels based on the horizontal length of the feature map and the vertical length of the feature map.

Here, the multiple channels may be inversely realigned in the order of feature map channel numbers.

Furthermore, the processor 1820 generates a decoded feature map by converting each feature value corresponding to the inversely reconstructed feature map from an integer into a real number.

Here, each feature value may be converted from an integer into a real number through a normalization procedure that uses at least one of the average of feature values, the variance of feature values, the minimum value of a range after conversion, and the maximum value of a range after conversion.

The memory 1830 stores the feature map information.

Further, the memory 1830 stores various types of information generated by the feature map decoding apparatus 1800 according to the embodiment of the present invention, as described above.

In accordance with an embodiment, the memory 1830 may be configured independently of the feature map decoding apparatus 1800 to support functions for feature map decoding. Here, the memory 1830 may function as separate mass storage, or may include a control function for performing operations.

Meanwhile, the feature map decoding apparatus 1800 may include memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

By utilizing the feature map decoding apparatus, the feature map may be effectively decoded in the feature extraction procedure using a neural network model.

Furthermore, the feature map may be effectively decoded, and the decoded feature map may be effectively utilized in the neural network.

Figure 19:
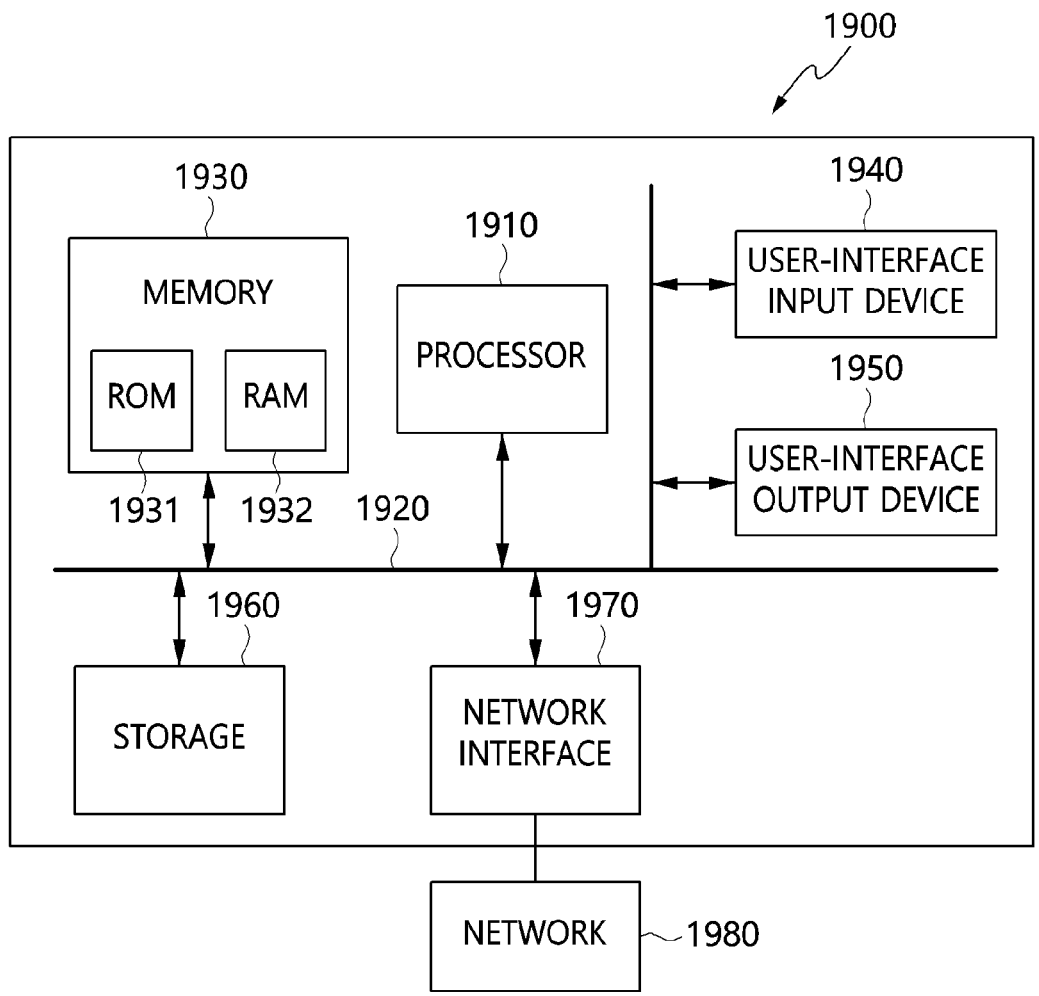
FIG. 19 is a block diagram illustrating a computer system according to an embodiment of the present invention.

FIG. 19 is a block diagram illustrating a computer system according to an embodiment of the present invention.

Referring to FIG. 19, the embodiment of the present invention may be implemented in a computer system, such as a computer-readable storage medium. As illustrated in FIG. 19, a computer system 1900 may include one or more processors 1910, memory 1930, a user interface input device 1940, a user interface output device 1950, and storage 1960, which communicate with each other through a bus 1920. The computer system 1900 may further include a network interface 1970 connected to a network 1980. Each processor 1910 may be a Central Processing Unit (CPU) or a semiconductor device for executing processing instructions stored in the memory 1930 or the storage 1960. Each of the memory 1930 and the storage 1960 may be any of various types of volatile or nonvolatile storage media. For example, the memory 1930 may include Read-Only Memory (ROM) 1931 or Random Access Memory (RAM) 1932.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

For example, the feature map encoding apparatus and the feature map decoding apparatus illustrated in FIGS. 13 and 18 may be implemented to correspond to the computer system of FIG. 19.

According to the present invention, there can be provided technology for effectively encoding and decoding a feature map in a feature extraction process using a neural network model.

Further the present invention may provide technology that is capable of effectively utilizing an encoded and decoded feature map in a neural network while effectively encoding and decoding a feature map.

As described above, in the apparatus for encoding and decoding a feature map and the method using the apparatus according to the present invention, the configurations and schemes in the above-described embodiments are not limitedly applied, and some or all of the above embodiments can be selectively combined and configured such that various modifications are possible.

What is claimed is:

1. A feature map encoding apparatus, comprising:
 a processor for acquiring feature map information corresponding to a feature map, reconstructing the feature map based on the feature map information, and generating an encoded feature map by converting each feature value corresponding to the reconstructed feature map from a real number into an integer; and
 a memory for storing the feature map information,
 wherein when the feature map is reconstructed using multiple channels, the processor reconstructs the feature map by classifying the multiple channels into one or more feature map channel groups based on feature values, realigning the classified multiple channels in an order of the feature map channel groups, and reconstructing the realigned multiple channels into one feature map channel.

2. The feature map encoding apparatus of claim 1, wherein the feature map information includes at least one of a neural network layer number, a feature map horizontal length, a feature map vertical length, a feature map channel length, a feature map channel number, and a feature map channel difference.

3. The feature map encoding apparatus of claim 1, wherein the processor determines similarities between a feature value of a reference channel and respective feature values of the multiple channels and classifies the multiple channels into the one or more feature map channel groups in descending order of similarities.

4. The feature map encoding apparatus of claim 1, wherein the one feature map channel corresponds to a matrix form having a preset size.

5. The feature map encoding apparatus of claim 4, wherein the processor sequentially inputs the realigned multiple channels to matrix values of the one feature map channel.

6. The feature map encoding apparatus of claim 1, wherein the processor converts each feature value from a real number into an integer through a normalization procedure that uses at least one of an average of the feature value, a variance of the feature value, a minimum value of a range after conversion, and a maximum value of the range after conversion.

7. The feature map encoding apparatus of claim 1, wherein the processor classifies the multiple channels into the one or more feature map channel groups using a clustering algorithm.

8. A feature map decoding apparatus, comprising:
 a processor for acquiring feature map information corresponding to an encoded feature map, inversely reconstructing the encoded feature map based on the feature map information, and generating a decoded feature map by converting each feature value corresponding to the inversely reconstructed feature map from an integer into a real number; and a memory for storing the feature map information, wherein the encoded feature map is generated by acquiring feature map information corresponding to a feature map, reconstructing the feature map based on the feature map information, and converting each feature value corresponding to the reconstructed feature map from a real number into an integer, wherein the feature map is reconstructed by classifying multiple channels into one or more feature map channel groups based on feature values, realigning the classified multiple channels in an order of the feature map channel groups, and reconstructing the realigned multiple channels into one feature map channel.

9. The feature map decoding apparatus of claim 8, wherein the feature map information includes at least one of a neural network layer number, a feature map horizontal length, a feature map vertical length, a feature map channel length, a feature map channel number, and a feature map channel difference.

10. The feature map decoding apparatus of claim 9, wherein the processor divides one feature map channel corresponding to a matrix form having a preset size into multiple channels based on the feature map horizontal length and the feature map vertical length.

11. The feature map decoding apparatus of claim 10, wherein the processor inversely realigns the multiple channels in an order corresponding to the feature map channel number.

12. The feature map decoding apparatus of claim 8, wherein the processor converts each feature value from an integer into a real number through a normalization procedure that uses at least one of an average of the feature value, a variance of the feature value, a minimum value of a range after conversion, and a maximum value of the range after conversion.

13. A method for encoding and decoding a feature map, comprising:

acquiring feature map information corresponding to a feature map, and reconstructing the feature map based on the feature map information;

generating an encoded feature map by converting each feature value corresponding to the reconstructed feature map from a real number into an integer;

acquiring the feature map information, and inversely reconstructing the encoded feature map based on feature map information corresponding to the encoded feature map; and generating a decoded feature map by converting each feature value corresponding to the inversely reconstructed feature map from an integer into a real number, wherein reconstructing the feature map comprises:

when the feature map is reconstructed using multiple channels, classifying the multiple channels into one or more feature map channel groups based on feature values;

realigning the classified multiple channels in an order of the feature map channel groups; and reconstructing the realigned multiple channels into one feature map channel.

14. The method of claim 13, wherein the feature map information includes at least one of a neural network layer number, a feature map horizontal length, a feature map vertical length, a feature map channel length, a feature map channel number, and a feature map channel difference.

15. The method of claim 13, wherein classifying the multiple channels comprises:

determining similarities between a feature value of a reference channel and respective feature values of the multiple channels, and classifying the multiple channels into the one or more feature map channel groups in descending order of similarities.

16. The method of claim 15, wherein:

generating the encoded feature map comprises converting each feature value from a real number into an integer through a normalization procedure that uses at least one of an average of the feature value, a variance of the feature value, a minimum value of a range after conversion, and a maximum value of the range after conversion, and generating the decoded feature map comprises converting each feature value from an integer into a real number through a normalization procedure that uses at least one of an average of the feature value, a variance of the feature value, a minimum value of a range after conversion, and a maximum value of the range after conversion.

* * * * *